UNITED STATES PATENT OFFICE.

ALEXANDER S. RAMAGE, OF DETROIT, MICHIGAN, ASSIGNOR TO RAMAGE TECHNICAL COMPANY, OF DETROIT, MICHIGAN, A CORPORATION OF MICHIGAN.

PROCESS OF PRODUCING LACTALBUMEN AND MILK-SUGAR.

No. 801,691. Specification of Letters Patent. Patented Oct. 10, 1905.

Application filed January 16, 1905. Serial No. 241,339.

*To all whom it may concern:*

Be it known that I, ALEXANDER S. RAMAGE, a citizen of the United States of America, residing at Detroit, in the county of Wayne and State of Michigan, have invented certain new and useful Improvements in Processes of Producing Lactalbumen and Milk-Sugar, of which the following is a specification.

This invention is a process of treating whey to recover therefrom the proteid contents or lactalbumen and the lactose.

In carrying out the process clear whey is rendered slightly alkaline with any suitable agent—for example, lime-water or sodium carbonate. The whey is then evaporated to dryness, preferably in a rotary vacuum film drier, such as one of the Passburg type, at a temperature not above 145° Fahrenheit. The dried whey is dissolved in a minimum volume of water and an equal volume of alcohol, preferably methyl-alcohol, is added. The lactalbumen is thereby precipitated and is filtered off. To the clear filtrate is added an equal volume of alcohol, preferably methyl, and the mixture is allowed to stand until the lactose has been thrown down as a pure white finely-crystalline deposit. The lactose is filtered off and washed with methyl-alcohol. The final filtrate and washings are distilled to recover the alcohol.

This process enables the lactalbumen and lactose to be recovered with a minimum amount of alcohol, thus avoiding the large alcohol losses which are incident to the processes of my Patents Nos. 730,703, of June 9, 1903, and 735,148 and 735,149, of August 4, 1903. The evaporation of the whey in a film-drier is also important, as the proteid contents causes excessive foaming when an ordinary vacuum-pan is employed.

I claim—

1. The process of producing lactalbumen from whey, which consists in evaporating the whey to dryness, dissolving the dried whey in a small amount of water, and adding sufficient alcohol to precipitate the proteid contents, as set forth.

2. The process of producing lactalbumen and lactose from whey, which consists in evaporating the whey to dryness, dissolving the dried whey in a small amount of water, adding sufficient alcohol to precipitate the proteid contents, removing the precipitate, and finally adding sufficient alcohol to precipitate the lactose, as set forth.

3. The process of producing lactalbumen from whey, which consists in evaporating the whey to dryness by heating films of the whey, dissolving the dried whey in a small amount of water, and adding sufficient alcohol to precipitate the proteid contents, as set forth.

4. The process of producing lactalbumen and lactose from whey, which consists in evaporating the whey to dryness by heating films of the whey, dissolving the dried whey in a small amount of water, adding sufficient alcohol to precipitate the proteid contents, removing the precipitate, and finally adding sufficient alcohol to precipitate the lactose, as set forth.

In testimony whereof I affix my signature in presence of two witnesses.

ALEXANDER S. RAMAGE.

Witnesses:
 IRVING W. DURFEE,
 C. H. BENNETT.